(12) United States Patent
Bermon et al.

(10) Patent No.: US 6,341,240 B1
(45) Date of Patent: Jan. 22, 2002

(54) METHOD OF ALLOCATING WORK IN CAPACITY PLANNING

(75) Inventors: Stuart Bermon, Mt. Kisco; Gerald E. Feigin, Scarborough, both of NY (US)

(73) Assignee: International Business Machines Corporation, Amonk, NY (US)

( * ) Notice: Subject to any disclaimer, the term of this patent is extended or adjusted under 35 U.S.C. 154(b) by 0 days.

(21) Appl. No.: 09/325,545

(22) Filed: Jun. 4, 1999

Related U.S. Application Data

(63) Continuation-in-part of application No. 08/901,300, filed on Jul. 28, 1997.

(51) Int. Cl.[7] .............................................. G06F 19/00
(52) U.S. Cl. ................................ 700/97; 705/8
(58) Field of Search ............................ 700/179, 100, 700/160, 169, 97, 90, 99, 29; 705/7, 8

(56) References Cited

U.S. PATENT DOCUMENTS

| | | | | |
|---|---|---|---|---|
| 5,086,397 A | * | 2/1992 | Schuster et al. | 700/110 |
| 5,280,425 A | * | 1/1994 | Hogge | 712/300 |
| 5,285,392 A | * | 2/1994 | Kyle et al. | 700/100 |
| 5,630,070 A | * | 5/1997 | Dietrich et al. | 705/8 |
| 5,649,113 A | * | 7/1997 | Zhu et al. | 705/7 |
| 5,710,700 A | * | 1/1998 | Kurtzberg et al. | 700/29 |
| 5,748,478 A | * | 5/1998 | Pan et al. | 700/99 |
| 5,764,543 A | * | 6/1998 | Kennedy | 703/2 |

* cited by examiner

*Primary Examiner*—William Grant
*Assistant Examiner*—Zoila Cabrera
(74) *Attorney, Agent, or Firm*—McGuireWoods, LLP; Stephen C. Kaufman

(57) ABSTRACT

A computer implemented method provides accurate capacity planning for manufacturing environments comprising parallel, unrelated tools that can process the same operations at different rates and with preferences for the sequence in which those tools are selected to accommodate the workload. The method reliably determines precisely what are the gating tools among sets of parallel, unrelated tools in a complex manufacturing environment in which different tools can perform the same or similar sets of operations, generally at different rates. The primary, secondary, etc. tool groups in each cascade set are explicitly kept track of in order to enable the correct penalty function to be associated, in one implementation with the appropriate tool group, and in another implementation with the tool allocation variables. The end user may also interact with the input data through a Menu Program or through a Graphical User Interface (GUI) and modify the data for "what-if" analyses.

23 Claims, 7 Drawing Sheets

METHOD OF ALLOCATING WORK IN CAPACITY PLANNING

Related Applications

This is a Continuation in Part of U.S. patent application Ser. No. 08/901,300 of the same title filed on Jul. 28, 1997.

BACKGROUND OF THE INVENTION

1. Field of the Invention

The present invention generally relates to a method for allocating work in capacity planning and, more particularly, to a method for accurate capacity planning which deals with parallel, unrelated tools that can process the same operations at different rates and with the preferences for the sequence in which those tools are selected to accommodate the workload.

2. Background Description

The capacity of a manufacturing line is characterized by the tool set that occupies the line. This tool set may represent a large capital investment ($1B for semiconductor fabrication) and depreciation burden. It typically consists of multiple generations of tools giving rise to a mix of different equipment with different yields, availabilities and speeds for completing particular operations. Also, engineers typically have an understanding of which tools are best suited to perform a particular operation, which tools are next best, and so on. The best tool may be the fastest or highest yielding. The second best may be an older, slower, less reliable tool. Depending on the manufacturing environment and life cycles of the products and tools, there may be as many as five or more different tools that can perform a given process step, each with its own distinct operating characteristics.

Broadly speaking, manufacturing capacity planning addresses three kinds of problems:

(1) deciding the number of tools necessary to produce a particular product mix and volume;

(2) deciding what is the "optimal" product mix and volume to maximize the value of an existing tool set; and (3) deciding on what additional tools to acquire to add to an existing tool set.

In a simple manufacturing environment, addressing all three questions is relatively straightforward. For example, for the case of calculating the required number of tools when operations are not shared among tools, one can simply divide the time required per day to perform all the operations done by a certain type of tool by the time available per day for this type of tool to arrive at an estimate of the number of required tools. However, in the more complex manufacturing environments in which different tools can perform the same or similar sets of operations, generally at different rates, these decisions become much more difficult because of the different ways in which work can be allocated among different tools. The necessity of respecting the preferred order in which the machines are assigned work further increases the level of the complexity of the problem.

Typically, capacity planning problems are addressed by making use of some type of mathematical model of the manufacturing process. The model may take the form of a simple spreadsheet, a detailed discrete event simulation, or a mathematical program such as a linear or mixed integer program. W. J. Hopp and M. L. Spearman, *Factory Physics: Foundations of Manufacturing Management*, Irwin (1996), and E. A. Silver and R. Peterson, *Decision Systems for Inventory Management and Production Planning*, 2nd Ed., John Wiley & Sons (1985), provide simple examples of conventional capacity planning problems and how to analyze them. W. Chou and J. Everton, "Capacity Planning for Development Wafer Fab Expansion", *Proc. of the 1997 7th Annual IEEE/SEMI Advanced Semiconductor Manufacturing Conference*, pp. 17–22 (1996), describe the use of a discrete event simulation model in capacity planning. K. M. Bretthauer and M. J. Cote, "Nonlinear Programming for Multiperiod Capacity Planning in a Manufacturing System", *European Journal of Operational Research*, 96:1, pp. 167–179 (1997), and R. G. Kasilingam and C. Roze, "Formulations of the Capacity Planning Problem Considering Manufacturing Flexibility", *International Journal of Systems Science*, 27:10, pp. 1027–1031 (1996), describe mathematical programming models for capacity planning. L. M. Wein, "Capacity Allocation in Generalized Jackson Networks", *Operations Research Letters*, Vol. 8. pp. 143–146 (1980), describes a method for capacity planning based on a queuing network model that assumes, among other things, that all tools capable of performing a given operation are identical. R. C. Leachman and T. F. Carmon, "On Capacity Modeling for Production Planning with Alternative Machine Types", *IIE Transactions*, 24:4, pp. 62–72 (1992), discuss capacity modeling with alternate machine types, but present a method that assumes that processing times among such alternate machine types are identical or proportional across operations they can perform. None of the above addresses capacity planning problems in which work can be allocated to different tools, with varying ratios of process times from operation to operation and in which there exists a preferred order in which tools are used.

SUMMARY OF THE INVENTION

It is therefore an object of the invention to provide a method for accurate capacity planning which deals with parallel, unrelated tools that can process the same operations at different rates and with the preferences for the sequence in which those tools are selected to accommodate the workload.

It is another object of the invention to provide a method for the reliable determination of precisely what are the gating (bottleneck) tools among sets of parallel, unrelated tools in a complex manufacturing environment in which different tools can perform the same or similar sets of operations, generally at different rates.

According to the invention, there is provided a method implemented on a computation engine that aggregates very raw data detailing by time period, the processing times, tool availabilities, load factors, and the number of passes per product for every operation on every tool group in the manufacturing line into the required inputs. The computation engine scans the list of operations, locating identical operation names within cascade sets of tool groups and organizes tool groups and the operations into the appropriate cascade groups. The primary, secondary, etc. tool groups in each cascade set are explicitly kept track of in order to enable the correct penalty function to be associated with the appropriate tool group. The end user may also interact with the input data through a Menu Program or through a Graphical User Interface (GUI) and modify the data (for example, changing the allowed ranges for product starts, the profits associated with each product and/or the numbers of tools per tool group) for "what-if" analyses.

The method according to the invention for allocating work in rank order across parallel unrelated tools for capacity planning is formulated as a non-integer, linear program with piecewise-linear penalty terms incorporated into the objective function which serve to discourage, but not prevent, using a tool group to greater than 100% of its available time and to distribute work in the preferred sequence among such parallel, unrelated tool groups. In this way, the implementation is able to provide output data on both the number of tools needed for a particular product mix and volumes and on the optimal product mix and volumes for a fixed tool set. Output data is contained in formatted output reports by individual time period and in multi-period summary reports which detail required versus available numbers of tools and/or the derived optimum number of starts per day by product.

The results of the various "what-if" scenarios are organized into sets of files whose filenames end in a characteristic suffix, a trial name, initially selectable by the user and which he can use to retrieve such files by selection through the GUI or Menu. If desired, detailed output reports can be printed breaking down tool group usage by operation, such information frequently being of vital interest to engineers with responsibility for particular cascade sets.

The implementation also includes a module, that using the capability described in the invention of being able to identify truly gating tool groups among parallel, unrelated tool groups, selects those tool groups for incrementing, producing a new optimal solution for product mix and volume that represents the most efficient way of increasing manufacturing line output for the least number of additional tools. Any number of automatic iterations of the tool set can be set by the user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
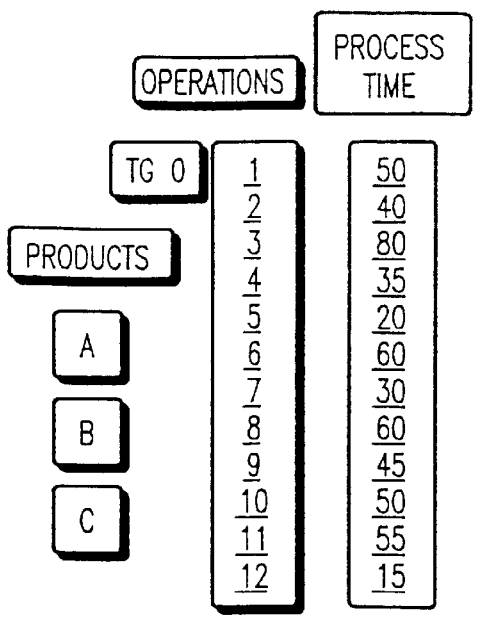
FIGS. 1A and 1B are respectively block diagrams illustrating examples of a non-cascade tool group and a cascade set consisting of several cascade tool groups.

The solution to capacity planning problems in which work can be allocated to different tools, with varying ratios of process times from operation to operation and in which there exists a preferred order in which tools are used according to the present invention assumes that all tools in a factory can be grouped into distinct tool groups. A tool group consists of a set of one or more identical tools. By identical, what is meant is that each tool in a tool group is qualified to perform the same set of operations at the same speed with the same reliability. From the perspective of capacity planning, tools are viewed as belonging to a given tool group as indistinguishable. As a result, a tool group containing N tools has N times the capacity of a single tool contained in the tool group. Tools in different tool groups may be able to perform the same or similar sets of operations, possibly at different speeds. Tools from different tool groups that can perform at least one operation in common are referred to as parallel and unrelated; parallel because they can all be used to perform the common operations and unrelated because they perform operations at different speeds and with different reliability. Among such sets of parallel unrelated tool groups, there will exist a tool group of first choice to which work is initially directed and which is referred to as the primary tool group. If that tool group is occupied, work is then directed to the next tool group of choice, referred to as the secondary tool group. In turn, if the secondary tool group is not available, work flows to the third tool group in line, referred to as the tertiary tool group. The fourth and fifth ranked tool groups in a set are the quaternary and quintinary tool groups, respectively.

A central aspect of the method in accordance with the invention is the writing of a constraint equation for each distinct operation on the production line. The left side of the equation represents the total required time to process every pass of every product upon which that operation acts, referenced to the primary or otherwise preferred tool group in the set of tool groups capable of performing the operation. The right side of the equation is the sum, over each tool group capable of performing the operation, of the available time per day (normalized by the respective process time ratio) multiplied by the fraction of the tool group's total capacity devoted to performing the operation. Because the actual constraints on production are determined by the capabilities of the individual tool groups, it is necessary to sum all the fractional tool allocation variables to obtain a variable for the total utilization of a tool group from all operations capable of being performed on the tool group. The method of the invention involves getting from the constraint equations to the equations for the total utilization of tool groups.

The preferred methodology is to use the concept of cascade groups. Tool groups with operations in common are referred to as cascade sets, the term cascade reflecting the above described behavior in which work cascades down from the primary to successively lower ranked tool groups. Those that do not share work with other tool groups are called non-cascade tool groups.

Figure 1B:
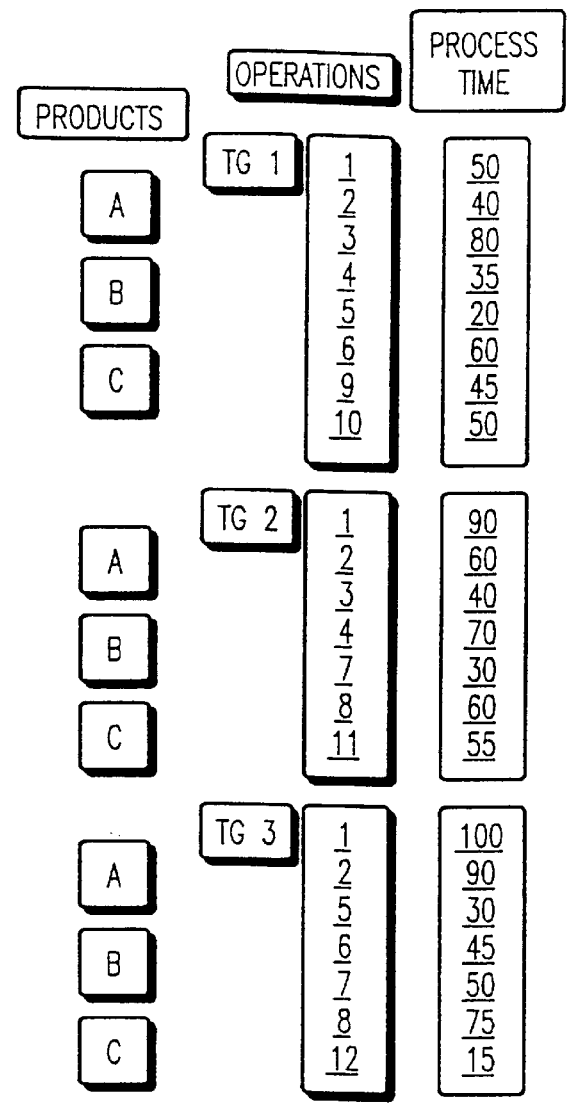

Referring now to the drawings, and more particularly to FIGS. 1A and 1B, there is shown a simple example illustrating the difference between a non-cascade tool group and a set of cascaded tool groups. In this example, three different products labeled A, B and C are required to be processed through the twelve operations labeled 1 through 12. In FIG. 1A, the case illustrated is one in which all twelve operations are performed by one non-cascade tool group, TG0. In this case, the capacity planning problem reduces to the relatively simple problem of figuring out the number of tools in this tool group needed to process a specified number of products A, B and C per unit of time. For example, suppose we would like to be able to produce ten parts of product A per day, twenty of B and fifteen of C. Since each part requires fifty-four minutes of processing (the sum of the processing time for operations 1 through 12), the total required processing time is 54×10+54×20+54×15=2430 minutes or 40.5 hours. Suppose each tool is available for fifteen hours per day. Then a minimum of three (40.5/15=2.7 rounded up to the nearest integer) tools is required to produce the required number of products.

The situation depicted in FIG. 1B, on the other hand, is more complex. In this case, there are three tool groups belonging to a cascade set, each of which can perform a subset of all the operations. Tool group TG1 is designated as the primary tool group, tool group TG2 is the secondary tool group, and tool group TG3 is the tertiary tool group. Some operations are shared among all three tool groups, some between two and some are confined to only one tool group. The ratio of the sample process times for tool groups performing the same operation varies over a wide range. The simple analysis that works for the case illustrated in FIG. 1A does not apply to the case illustrated in FIG. 1B because work is capable of flowing back and forth among all three tool groups. A more general approach must be formulated that takes into account both the sharing of work among tool groups (with different process rates) as well as the indicated order preference for allocating work among the various tool groups.

The third broad problem addressed by capacity planning analysis is deciding on what additional tools to acquire to add to an existing tool set. For such purpose, it is essential to determine what tool groups constitute gating or bottleneck tool groups; i.e., those tool groups, as the terms imply, that limit the production of the line. Gating non-cascade tool groups are simply those tool groups that are operating at 100% of capacity. For unrelated, parallel tool groups that can partially share work namely those of a cascade set, the situation is much more complicated. Cascade tool groups may be at the 100% level, but not be gating because additional workload can be freely allocated to other members of the cascade set. On the other hand, such tool groups may be truly gating because the other cascade tool groups are not able to handle any additional work at the product mix in question, because of the way in which the operations are segregated among the tool groups of the cascade set. It is not possible to distinguish gating from non-gating cascade tool groups merely by noting their fractional use. A method is needed that can simply and reliably identify the unrelated, parallel tool groups that are truly gating.

The present invention is a method for calculating the allocation of the workload to parallel, unrelated tool groups (tool groups in a cascade set), with a preference for the order in which the tool groups are to be used and in which the ratios of the process times of operations performed on different tool groups varies by operation. The method of the invention also identifies which tool groups of a cascade set are gating. The required input data describes the tool group parameters and the workload for each product. The calculated output consists either of the number of tools required per tool group to produce a particular product mix and volume, or of the optimal product mix and volume for a particular fixed tool set. Gating tool groups are explicitly indicated. The output is delivered directly to the end user or as an input to other decision support systems.

The allocation of the workload is calculated using mathematical programming, in which equations are defined for each distinct process step and the unique set of tool groups capable of performing that process step are written and the time required to process multiple products through that operation is related to the time available on this set of tool groups and to the fractional uses of each of the tool groups. These equations effectively constrain the optimal solution through the use of penalty terms in the objective function associated with each tool group, which represent the preferred order for using the parallel unrelated tool groups in each cascade set.

Single Distinct Operation

First we consider the case of a single distinct operation. We distinguish here between a sequential and a distinct operation. A large manufacturing line may process 50 different product families (a collection of products with the same routing on the line) each of which requires 400 to 600 process steps in sequence for a total of approximately 25,000 separate sequential operations. Many of these sequential operations are, however, the same operation repeated across many different products or even repeated on the same product. The latter case is a reentrant process, a process in which a part returns to the same tool group time and again to have similar operations performed. The number of times a part visits the same tool group to undergo essentially the same operation is the number of passes for that operation for that product family. By aggregating the similar sequential operations across product families (as well as within a single product family) into distinct operations, we can reduce the number of necessary constraint equations by an order of magnitude (e.g. from 25,000 to 2,500) with a corresponding reduction in the number of decision variables. This greatly reduces the required linear programming solution time.

Of course, it is possible, although highly inefficient, to formulate the method by writing a constraint equation for each sequential operation rather than aggregating the sequential operations into distinct operations. Such a "sequential operation method" may be regarded as the limiting case of the above described "distinct operation method" which is a preferred embodiment of the invention.

Shown in Equation (1) below is the constraint equation described in the previous paragraph for the simplest case, consisting of a set of parallel unrelated tool groups (denoted by T) capable of performing a single distinct operation (denoted by s) on multiple products (denoted by P):

$$\sum_{p \in P} W_p U_{p,s} = \sum_{t \in T} f_{s,t} N_t \frac{A_t}{R_{s,t}} \tag{1}$$

Here $N_t$ and $A_t$ are the number of tools in the tool group t and the available time per day for each such tool group, respectively, while $R_{s,t}$ is the ratio of the processing time of tool group t to that of the primary or preferred tool group. Also, $f_{s,t}$ is the fractional allocation decision variable, i.e. the fraction of total time available on tool group t that is allocated to performance of operation s. Finally, the decision variable $W_p$ is the number of unit starts per day of product p being processed through operation s, while parameter $U_{p,s}$, called Usage, is the time required to process one unit start of product p through operation s (including all passes of that product through s) on the primary or preferred tool group among the set of parallel unrelated tool groups capable of performing the operation s. Calculation of the Usage $U_{p,s}$ takes into account the fact that the number of parts of product p arriving at a tool group is in general less than the number of starts $W_p$ of product p ($W_p$ being the decision variable) because of yield loss during the manufacturing process. Thus if the integer quantity $I_{p,s}$ represents the number of passes for product p undergoing operation s, and if $Y_{p,s}$ represents the fractional yield averaged over all passes of a part for product p undergoing operation s, then the Usage is given by:

$$U_{p,s} = Y_{p,s} I_{p,s} H_{s,tp} \tag{2}$$

where $H_{s,tp}$ is the time required to process one part through operation s on the primary or otherwise preferred tool group, tp, of those tool groups, t, capable of performing operation s. It is convenient for later use to define the parameter $$J_{p,s} = Y_{p,s} I_{p,s} \quad (3)$$

where $J_{p,s}$ is the effective number of passes, adjusted for yield loss, for product p undergoing operation s. In terms of $J_{p,s}$, the expression for Usage becomes:

$$U_{p,s} = J_{p,s} H_{s,tp} \quad (4)$$

The left side of Equation (1) represents the total required time referenced to the primary tool group for all products being processed through operation s, while the right side of the equation represents how that time will be allocated to each of the tool groups capable of performing that operation, with an effective available time per day for each tool group introduced in order to take into account the fact that the processing time on the various tool groups relative to the primary tool group is the variable ratio $R_{s,t}$.

For the limiting case of the sequential operation method, Equation (1) would take the form $$W_p U_{p,s} = \sum_{t \in T} f_{s,t} N_t \frac{A_t}{R_{s,t}} \quad (5)$$

where the left hand side of the equation is now a single term involving a single sequential operation rather than a summation over terms involving many sequential operations over different products and on the same product. The Usage $U_{p,s}$ is the (yield-adjusted) time required to process one unit start of product p through sequential operation s. No averaging of the yield factor over passes is done here, since the operation, in effect, represents a single pass.

Possible decision variables are $W_p$, $N_t$ and of course $f_{s,t}$. Fixing the number of tools converts this into a linear equation, enabling the use of linear programming techniques to obtain a solution.

A suitable objective function for the mathematical program (linear or non-linear) might take the form $$\text{Maximize} \sum_{p \in P} W_p P_p - \sum_i Z_i(f_{s,t}) \quad (6)$$

where $P_p$ might represent the profit or revenue produced by one unit start per day of product P. The first term thus represents the primary goal of maximizing total profit or revenue while the second provides for the allocation of work to tool groups in proper sequence. $Z_i(f_{s,t})$ are penalty functions associated with the variously ranked members in the set of parallel unrelated tool groups. $Z_1$ is the penalty function for the primary tool group, that to which work is to be channeled first, while $Z_2$ is that for the secondary tool group and $Z_3$ that for the tertiary tool group and so on for the quaternary and quintinary, etc. tool groups of the cascade set. The penalty functions are constructed so that the lower the rank of the tool group, the greater is the negative contribution to the objective function thus generating a preference for the higher ranked tool groups in the distribution of work. Such penalty functions may take any suitable form consistent with the above goal. For the linear programming case, they can be conveniently constructed using piecewise linear functions whose slopes increase with decreasing rank order of the tool group. Such an example of the use of piecewise linear functions is shown below.

Multiple Operations and Cascade Groups

The above formulation can be generalized for the more complicated case in which many operations are shared among a set of parallel unrelated tool groups. To handle the problem of multiple operations, in a preferred embodiment of the invention, we introduce the idea of cascade groups. Operations are organized into disjoint (non-overlapping) sets designated by a cascade group index g with the set 'OperbyGrp[g]' consisting of all those operations that can be performed on a specific combination of tool groups. The associated combination of tool groups is then defined as the set 'ToolsbyGrp[g]'. For convenience, we will sometimes refer to the sets 'OperbyGrp' as "operation cascade groups" and to a specific set 'OperbyGrp[g]' with group index 'g' as "operation cascade group g". Likewise, we will refer to the sets 'ToolsbyGrp' as "tool cascade groups" and to a specific set 'ToolsbyGrp[g]' with group index 'g' as "tool cascade group g". When referring to both types of sets, we will use the general terminology "cascade groups".

To graphically illustrate the concept of cascade groups, consider again FIG. 1B, wherein there is displayed the three tool group cascade set involving 12 operations. As previously described, some of the operations are shared among all three tool groups, some between two and some are restricted to one tool group alone. For convenience, the chart in Table 1A displays in a simplified format how the twelve operations are shared among the three tool groups. For example, operations 1 and 2 can be performed on all three tool groups; thus, they constitute elements of the set OperbyGrp[1] which has associated with it the set ToolsbyGrp[1] consisting of tool groups TG1, TG2 and TG3. For a cascade set consisting of three tool groups, there is, of course, just one such cascade group. Operations 3 and 4 are performed on tool groups TG1 and TG2 and thus constitute another cascade group (labeled 2). Two more such two-tool group cascade groups are possible, and in this example are shown labeled as tool groups TG3 and TG4. There are three more cascade groups involving just one tool group each, for a possible total of seven cascade groups. Table 1A shows how the twelve operations are shared among three tool groups. The seven possible cascade groups and the corresponding sets OperbyGrp and ToolsbyGrp are listed in Table 1B.

TABLE 1A

| Oper | TG1 | TG2 | TG3 |
|------|-----|-----|-----|
| 1    | X   | X   | X   |
| 2    | X   | X   | X   |
| 3    | X   | X   |     |
| 4    | X   | X   |     |
| 5    | X   |     | X   |
| 6    | X   |     | X   |
| 7    |     | X   | X   |
| 8    |     | X   | X   |
| 9    | X   |     |     |
| 10   | X   |     |     |
| 11   |     | X   |     |
| 12   |     |     | X   |

TABLE 1B

| Cascade group set index g | Sets OperbyGrp[g] | Sets ToolsbyGrp[g] |
|---|---|---|
| 1 | 1, 2 | 1, 2, 3 |
| 2 | 3, 4 | 1, 2 |
| 3 | 5, 6 | 1, 3 |
| 4 | 7, 8 | 2, 3 |

TABLE 1B-continued

| Cascade group set index g | Sets OperbyGrp[g] | Sets ToolsbyGrp[g] |
|---|---|---|
| 5 | 9, 10 | 1 |
| 6 | 11 | 2 |
| 7 | 12 | 3 |

The number of such groups for an arbitrary cascade set consisting of three tool groups may be fewer than seven depending on what operations are actually shared. For a two member cascade set, the number of possible cascade groups is three, while for a four member set, it is fourteen.

Cascade groups, by organizing operations into sets, the members of which are uniquely identified with a specific set of tool groups, provide the generalization of the simpler situation for non-cascade tools in which a set of operations is uniquely identified with a single tool group required to treat the case of operations shared among unrelated, parallel tools.

Table 2 shows the explicit ratios for each of the twelve operations of the process time of that operation on the indicated tool groups to that on the primary tool group in the same tool cascade group, or to that of the highest ranking tool group in the tool cascade group if the group does not contain a primary.

TABLE 2

Process Time Ratios by Operation and Tool Group

| Group | Opr | TG1 | TG2 | TG3 |
|---|---|---|---|---|
| 1 | 1 | 1.00 | 1.80 | 2.00 |
| 1 | 2 | 1.00 | 1.50 | 2.25 |
| 2 | 3 | 1.00 | 0.50 | |
| 2 | 4 | 1.00 | 2.00 | |
| 3 | 5 | 1.00 | | 1.50 |
| 3 | 6 | 1.00 | | 0.75 |
| 4 | 7 | | 1.00 | 1.67 |
| 4 | 8 | | 1.00 | 1.25 |
| 5 | 9 | 1.00 | | |
| 5 | 10 | 1.00 | | |
| 6 | 11 | | 1.00 | |
| 7 | 12 | | | 1.00 |

For the primary (or highest ranked T/P) that ratio is, of course, identically one. Each such ratio is characterized by a cascade group number, an operation number and a tool group number as shown in the table. Explicitly keeping track of these individual ratios in the formulation, as opposed to assuming they are constant or taking some sort of ratio average, is what enables the method according to the invention to deduce an exact answer for the allocation of work among the tool groups.

For the case of multiple operations, a constraint equation is still written for each operation as in Equation (1), but we now introduce an additional index or subscript g which describes to what cascade group the operation and the associated tool groups belong. Thus, we have $$\sum_{p \in P} W_p U_{p,g,s} = \sum_t f_{g,s,t} \frac{N_t A_t}{R_{g,s,t}} (t \in \text{ToolsbyGrp}[g]) \quad (7)$$

for all operations s (OperbyGrp[g]) belonging to the operation cascade group g. The fractional allocations $f_{g,s,t}$ (decision variables) and the process time ratios $R_{g,s,t}$ are now associated with the cascade group g in which the operation s is contained, as well as with the operation s and the cascade tool group t. By writing a constraint equation involving the appropriate fractional allocation decision variables for each and every operation, we are able to exactly handle the problem of process time ratios that vary in an arbitrary way from operation to operation. No assumptions concerning the constancy of such ratios are made, nor are any sort of averages, weighted or otherwise, of the individual process ratios over a cascade group or cascade set of tools taken.

In a similar way to Equation (1) for a single operation, the right side of Equation (6) represents the total required time referenced to the primary or otherwise preferred tool group for all products being processed through operation s, while the right side represents how that time will be allocated to each of the tool groups belonging to the tool cascade group g capable of performing that operation, with an effective available time per day or each tool group introduced in order to take into account the fact that the processing time on the various tool groups relative to the primary tool group is the variable ratio $R_{g,s,t}$.

For the limiting case of the sequential operation method, Equation (7) takes the form $$W_p U_{p,g,s} = \sum_t f_{g,s,t} N_t \frac{A_t}{R_{g,s,t}} \quad (8)$$

where, as in Equation (5), the left hand side involves a single term involving a single sequential operation rather than a summation over terms involving many sequential operations. The number of such sequential operations (and thus the number of required constraint equations and tool allocation decision variables) for any given operation cascade group is, of course, very much larger than for the distinct operation method.

Equation (7) is merely a defining equation for $f_{g,s,t}$. The actual constraining factors in the problem are the individual capacities of the separate tool groups. To make that connection, we define the fractional use (FracUse[t] for short) of an individual tool group, F. FracUse[t] is obtained by first summing over the set of all operations (OperbyGrp[g]) contained in operation cascade group g and then by summing over all the tool cascade groups g which contain the tool group t.

$$F_t = \sum_{g\,:\,t \in \text{ToolsbyGrp}[g]} \sum_{s \in \text{OperbyGrp}[g]} f_{g,s,t} \quad (9)$$

The expression g:t∈ToolsbyGrp[g] under the left hand summation explicitly confines the sum over cascade groups g to only those groups such that tool t is contained in the group. Equation (9) simply sums up all contributions to the utilization of the tool group from whatever operations are performed by the tool group contained in whatever cascade groups.

Penalty Functions

Usual practice would be to write a constraint equation requiring that $F_t \leq 1$ reflecting the consideration that a tool group cannot ordinary be used to more than 100% of its capacity. Frequently however, in realistic capacity planning, the planners, lacking adequate knowledge of the outcome, may set the minimums on the product starts per day ranges too high to prevent various tool groups from becoming overloaded. In such a case, an infeasible solution would be obtained, the output of which would not be reliable. No information on what the problem tool groups were would likely be available.

As part of this preferred implementation of the invention, we extend the penalty function concept introduced above to employ very large penalty functions in the objective function for values of FracUse $F_t$ greater than one, rather than absolutely prohibiting $F_t$ from exceeding one. In this way, a sensible feasible solution may still be obtained even though certain tool groups may have their capacities exceeded. Most importantly, such a solution can specifically reveal what the problem tool groups are and by specifically how much the designated product starts have forced them to exceed their nominal capacities. This represents key information to capacity planners. Numbers of tools or minimum starts per day values can then be adjusted to obtain a truly feasible solution.

The penalty functions for $F_t \geq 1$ increase with decreasing rank order of the tool group so that any overload is directed first to the primary which is the likely tool that would be purchased if it were deemed necessary to expand the capacity of the cascade set.

For $F_t \leq 1$, differing penalty functions dependent upon the FracUse $F_t$ associated with each type of tool group, primary, secondary, etc., cause the work coming to the cascade set to be distributed in the preferred rank order as in the simpler case of a single operation. Here, however, the penalty function is associated with the total fractional use of the tool group which is an aggregate of the individual fractional allocations associated with each operation the tool group is capable of performing. Again, in the case where the problem is treatable as a linear program, piecewise linear functions of successively greater slope can be utilized to direct work to the tool groups in the preferred rank order.

Figure 2:
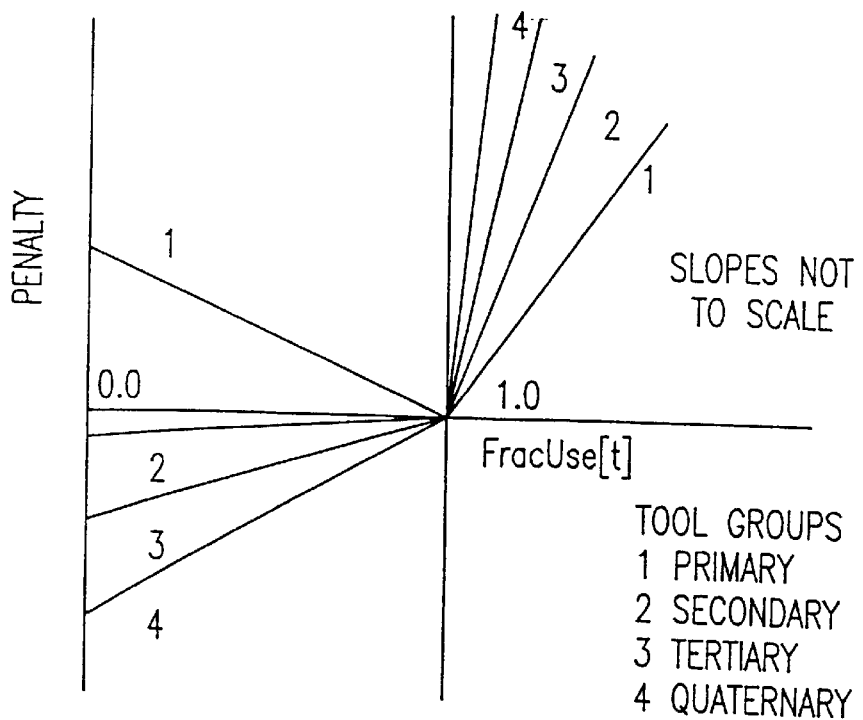
FIG. 2 is a graph showing penalty functions formulated as piecewise linear functions for a cascade tool set of four parallel, unrelated tool groups.

FIG. 2 shows one example of such a set of piecewise linear functions that accomplish the purpose of directing the work in such a preferred rank order to four tool groups in a cascade set. For $F_t \leq 1$, the negative slope for the primary with the function going to zero at $F_t=1$, encourages the desired maximum use of the primary up to its nominal full capacity at a FracUse of one. The very steep slope beyond one, ($F_t \geq 1$ slopes are several thousand times steeper than shown in the drawing) prevent overuse of the primary tool group in favor of the secondary, which below $F_t=1$, has the smallest slope of the non-primary tool groups. Work that cannot be accommodated on the secondary then flows to the tertiary, which has the next steepest slope and then to the quaternary with largest slope (below $F_t=1$) of all. Placing the function for the primary tool group above the axis with negative slope and the functions for the non-primary tool groups below the axis with positive slopes (instead of above as for the primary) minimizes the use of the non-primary tool groups and is necessary to prevent undesired use of non-primary tool group capacity by forcing slower operations to non-primary tool groups in order to bring their FracUse to as close to one as possible. Only when all the possible capacity below FracUse=1 has been utilized for all the tool groups, will a transition occur to the nominally forbidden region for $F_t \geq 1$. The successively steeper slopes in that region guarantee that the primary will be filled first and then the successively lower ranked tool groups in their appropriate order.

The ratio of the slopes of lower ranked tool groups to the higher ranked tool groups must be sufficiently great that possibly faster processing rates occurring on lower ranked tool groups will not cause work to be shifted to the lower ranked tool when capacity is available on the higher ranked one. If the average process rate on lower ranked tool group TG B is K times that of a higher ranked tool group TG A, then B's slope should exceed that for A by at least a factor of K. The slopes in this discussion are the base slopes. Because we are dealing with the FracUse of tool groups (as opposed to individual tools) whose capacities are proportional to the number of tools in the tool group, such base slopes must be multiplied by the number of tools $N_t$ contained in each respective tool group to arrive at the actual slope value used in the objective function. This is necessary to prevent work from being unduly transferred to a lower ranked tool group merely because it contains a greater number of tools than one more highly ranked.

A suitable objective function for the case of multiple operations would take the form:

$$\text{Maximize} \sum_{p \in P} W_p P_p - \sum_{i,t} Z_i(F_t) \quad (10)$$

where $Z_i(F_t)$ are the piecewise-linear penalty functions schematically depicted in FIG. 2 with $Z_1$ being the penalty function for the primary tool group, $Z_2$ the penalty function for the secondary tool groups, $Z_3$ the function for tertiary tool groups and so on for the tool groups of lower rank.

Use of Penalty Functions to Determine Tool Groups that are Gating

One of the classic problems for capacity analysis of a manufacturing line is to determine what tool groups constitute gating or bottleneck tool groups, i.e., those tool groups, as the terms imply, that limit the production of the line. Such tool groups are particularly important because it is to these tool groups that capacity needs to be added to increase output. Gating non-cascade tool groups are simply those tool groups that are operating at 100% of capacity. For tool groups that can partially share work, namely those of a cascade set, the situation is much more complicated. For example, just because a primary tool group is at 100% does not mean it is gating. Additional work might be able to be easily accommodated on the secondary or tertiary tool group of the cascade set. In general, this is the most common scenario. The primary tool group fills up to 100% capacity, with the work that cannot be handled by the primary tool group then channeled to the tool groups of lower rank, which are not filled. For the product mix producing such a solution, purchasing an additional primary tool would produce no additional product. On the other hand, it might indeed be the case that at the product mix in question, the non-primary tool groups are handling the maximum they can accommodate, in which case the 100% loaded primary tool groups would be truly gating. The difficulty is that such a situation may occur when the FracUse values for the non-primary tool groups are significantly below 1.0. This can result from the fact that in general only some operations, not all, are shared between the primary and non-primary tool groups. The fill factor of a non-primary tool group may be principally determined by the processing required for those operations uniquely confined to it with little to do with the work capable of being transferred between primary and non-primary. (Only when all operations are shared is it guaranteed that a FracUse value smaller than one indicates a tool group that can accommodate further work.) A similar problem exists in trying to use FracUse values to determine whether a non-primary tool group is gating, as they may frequently be.

Given that FracUse values by themselves cannot be used to determine what are the gating tool groups within a cascade set, this preferred implementation of the invention sets out a method to precisely identify which tool groups are gating through the use of penalty functions in the objective function. The method depends upon the idea of inserting an intermediate region along the FracUse axis, beginning at FracUse=1.0 and extending to a point 'x', an arbitrarily small distance beyond $F_t=1.0$. The start of the original region of very severe penalty functions is now displaced to $F_{t=x}$ from $F_t=1.0$. The penalty functions may in general be non-linear functions, but we illustrate a particular case using the piecewise linear functions displayed in FIG. 3.

Figure 3:
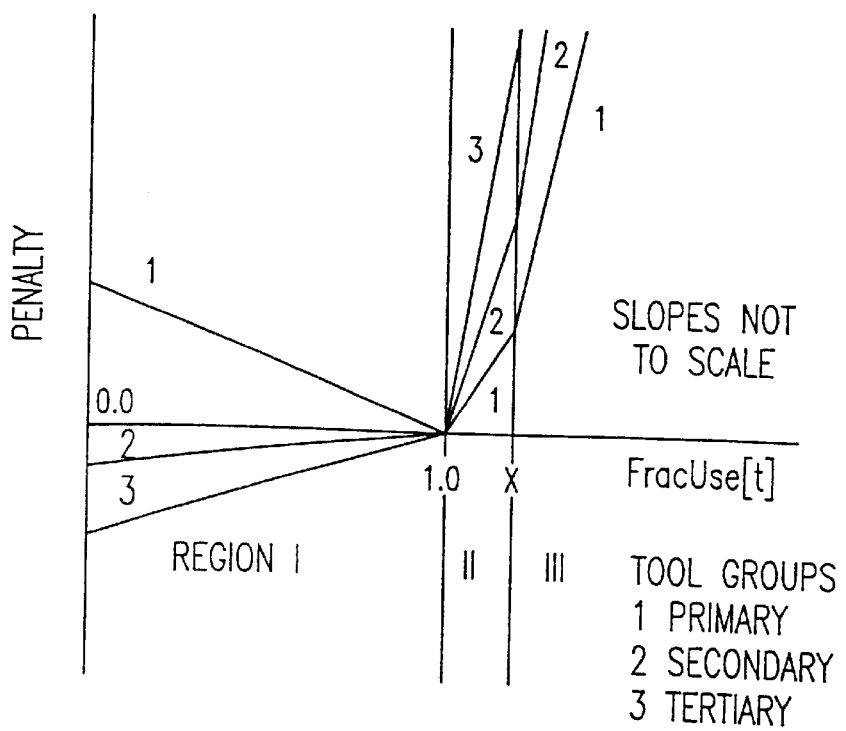
FIG. 3 is a graph showing piecewise linear functions constructed over three regions for the purpose of distinguishing what cascade sets of tool groups are truly gating.

In FIG. 3, regions I and III correspond to the two regions laid out previously in FIG. 2 for FracUse below one (permissible range) and FracUse above one (nominally forbidden range), respectively. The respective penalty slopes in those two regions do not undergo alteration. The newly introduced intermediate region II extends from FracUse=1 to FracUse=x, here shown with its width greatly exaggerated in size for clarity. Penalty slopes in region II are intermediate between those in regions I and III, but generally much closer in magnitude to those in region I. Consider the case of more work flowing to the primary tool group than it can handle. In the ordinary case that work will be displaced to the secondary tool group, once FracUse for the primary surpasses 1.0. This occurs because the penalty slope in region II (above 1.0) appreciably exceeds that for the secondary in region I below FracUse=1.0. The FracUse value for the primary remains precisely at 1.0. If however, because of mismatched operations between the primary and secondary, the secondary cannot accommodate this overflow regardless of the relative slopes, the point of operation on curve 1 will by necessity move up the small distance from 1.0 to x. A suitable value for x might be 1.001. Thus, consider two different optimal solutions involving a primary tool group with a nominal FracUse of one and a secondary with FracUse less than one, the first with a precise primary FracUse of 1.000 and the second with a primary FracUse of 1.001. In the first case, the primary would not be gating, while in the second case it definitely would be gating and thus a candidate for having a tool added to increase production. As in region III, the slopes in intermediate region II are made successively greater as the tool group rank decreases to assure that Tool groups are filled in the desired order. Thus, for example, if a secondary tool group were to exhibit a FracUse value of 1.001 (having climbed the steeper slope for curve 2 as compared to curve 1 for the primary), while the primary's FracUse remained at 1.000, one would conclude that the secondary had to be the gating tool group in this case.

Table 3 illustrates several cases of the cases discussed above.

TABLE 3

| | | | x = 1.001 | | |
|---|---|---|---|---|---|
| | TG | NumAv1 | NumReq | FracUse | |
| A) | 1 | 5 | 5.000 | 1.000 | Not Gating |
| | 2 | 4 | 3.208 | 0.802 | |
| | 3 | 2 | 1.660 | 0.830 | |
| B) | 1 | 5 | 5.005 | 1.001 | Gating |
| | 2 | 3 | 2.806 | 0.935 | |
| | 3 | 1 | 0.950 | 0.950 | |
| C) | 1 | 4 | 3.604 | 0.901 | |
| | 2 | 3 | 3.003 | 1.001 | Gating |
| | 3 | 1 | 0.960 | 0.960 | |
| D) | 1 | 4 | 4.004 | 1.001 | Gating |

TABLE 3-continued

| | | x = 1.001 | | |
|---|---|---|---|---|
| TG | NumAv1 | NumReq | FracUse | |
| 2 | 2 | 2.002 | 1.001 | Not Gating |
| 3 | 2 | 1.904 | 0.952 | |

Example A demonstrates the case where additional work can be accommodated on the secondary and tertiary tool groups. The primary tool group, nominally at 100% of capacity, is sitting at the beginning of region II with FracUse=1.000. In example B, the primary tool group has been forced to move up to the upper end of region II (FracUse=1.001) because the lower ranked tool groups can not take further work. The primary tool group is gating. Example C illustrates the case last described in the paragraph above; i.e., the primary tool group not gating, but the secondary tool group is gating. Case D is described below.

For the case of a non-primary tool group, it is not sufficient that it merely exhibit a FracUse value of 1.001 to qualify as a gating tool group and thus one which should have its number increased. The primary may also have a FracUse of 1.001 indicating the entire cascade set is gating. Additional work could be accommodated on either tool group. In such a case, one would ordinarily want to increment the primary tool group. (The secondary might be an older tool no longer even available.) In effect, secondary, tertiary, etc. tool groups are only considered gating if the primary tool group in the same cascade set is not gating; i.e., its FracUse<1.001. Thus, results among cascade sets should be scanned to eliminate from any list of potential gating cascade tool groups (those with FracUse=1.001) any non-primary tool groups in which the primary in the same set exhibits a value of 1.001. See case D in Table 3.

Of great use in capacity planning would be a utility that after having arrived at a feasible solution for an optimal mix of products for a given tool set, would automatically locate the truly gating tool groups, and automatically increment such tools to produce an iterated solution for a new mix of increased volume. A sequence of such iterations would provide an ordered progression representing the most efficient way of increasing production capacity with the minimum expenditure for new tools. The capability described above of being able to unambiguously identify gating Tool groups among parallel, unrelated tool groups enables such a utility to be realized.

Implementation

Figure 4A:
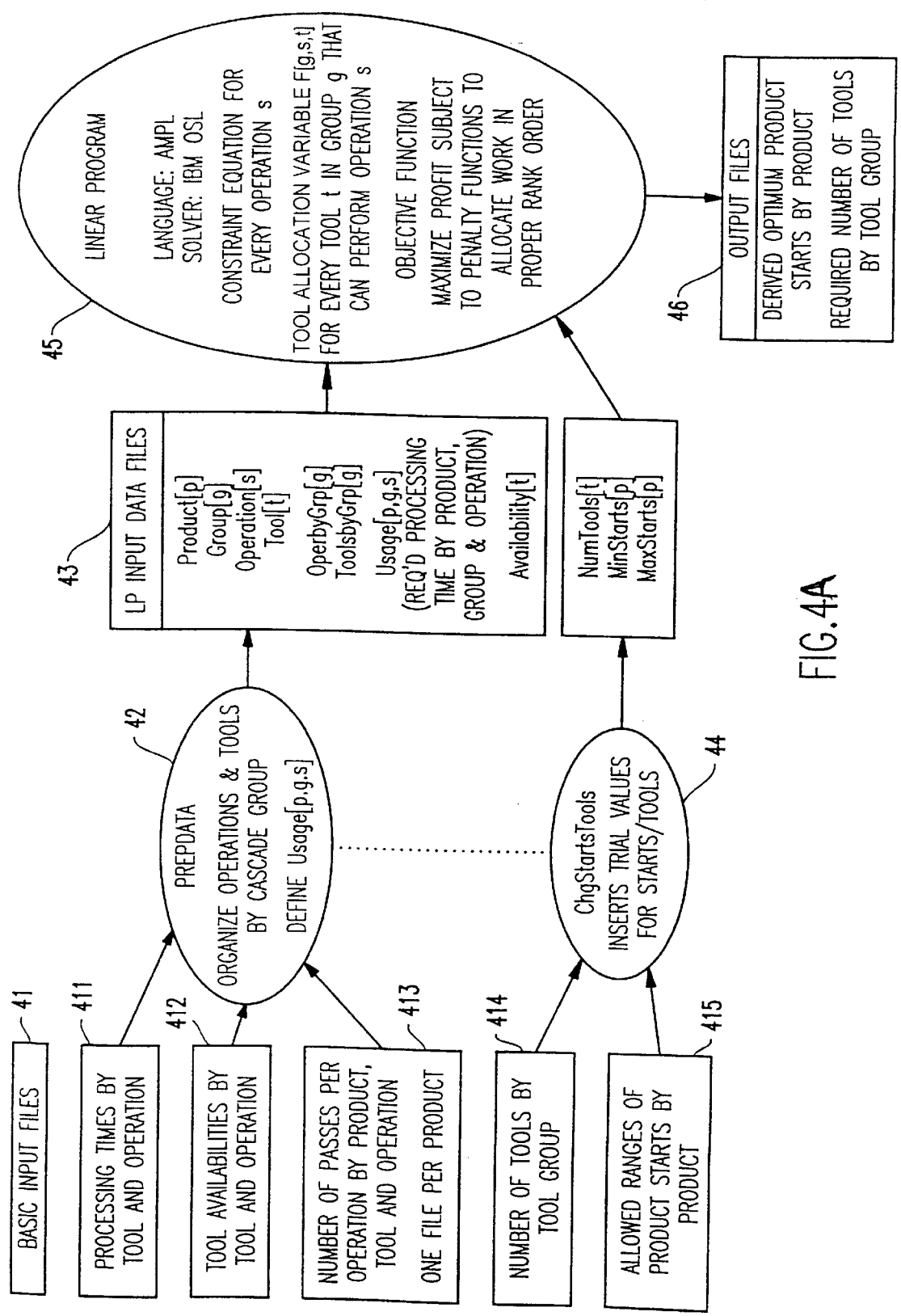
FIGS. 4A and 4B are flow diagram illustrating the logical implementation of the invention on a computational engine in two different implementations.

An implementation will now be described with reference to FIGS. 4A, and 5A, 5B and 5C. FIG. 4A are flow diagrams illustrating the logical implementation of the preferred embodiment on a computational engine. As shown in FIG. 4A, the implementation consists of an interface to a computation engine that aggregates very raw data, labeled "Basic Input Files" 41, detailing by time period, the processing times 411, tool availabilities and load factors 412, and the number of passes 413 per product for every operation on every tool group in the manufacturing line into the required inputs for the method invented. The computation engine 42, labeled PREPDATA in FIG. 4A, scans the list of operations, locating identical operation names within cascade sets of tool groups and organizes tool groups and the operations into the appropriate cascade groups, "OperbyGrp" and "ToolsbyGrp", respectively, as Linear Programming (LP) input data files 43, as previously described. The processing times and number of passes (the number of times a product visits a particular operation) for each operation and product are combined into a derived quantity called the "Usage(p,g,s)", denoted by $U_{p,g,s}$ in Equation (7), which represents the required time to process a unit start of product p through all passes of operation s, on the primary or otherwise preferred tool group contained in tool cascade group g. The primary, secondary, etc. tool groups in each cascade set are explicitly kept track of in order to enable the correct penalty function to be associated with the appropriate tool group.

Figure 5A:
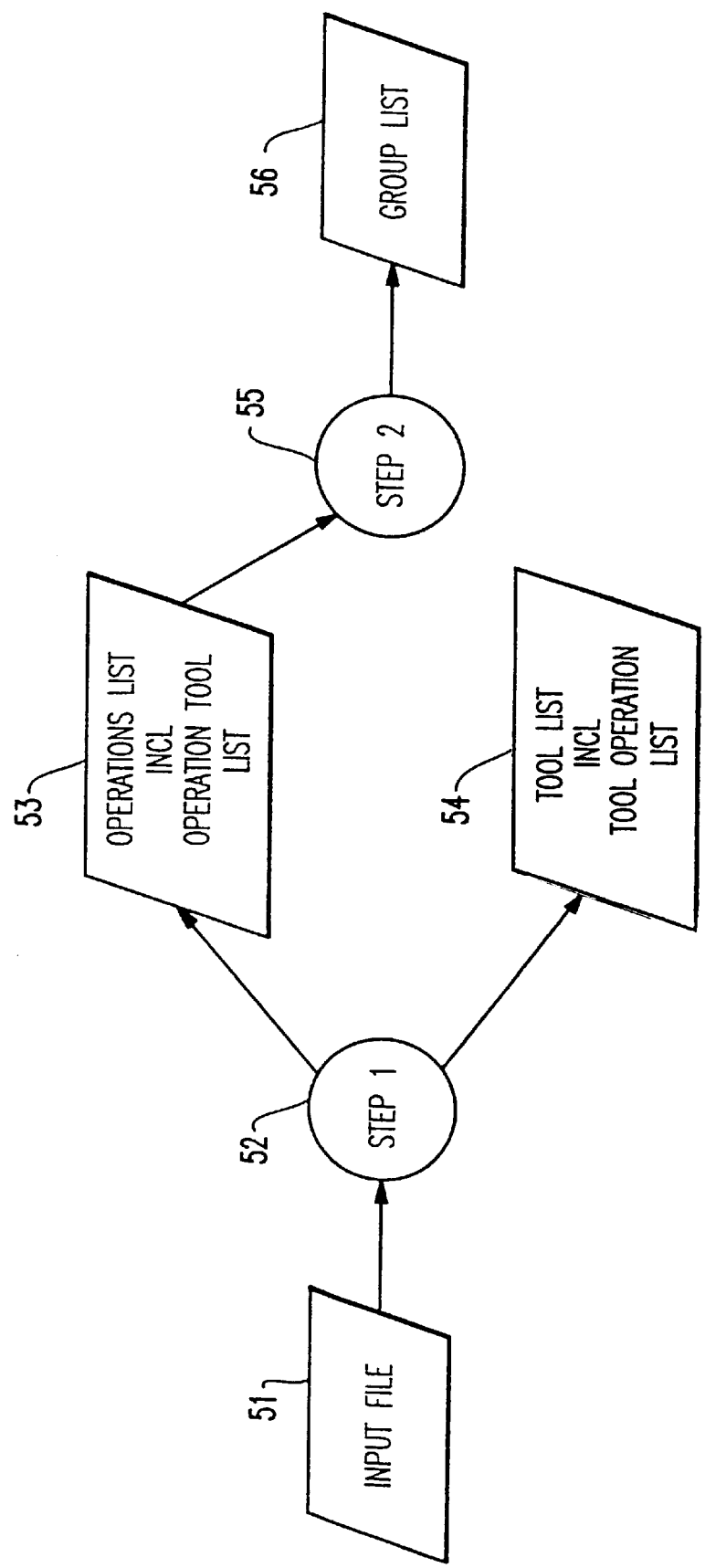
FIGS. 5A, 5B and 5C are detailed flow diagrams illustrating the action of the specific computational engine described in FIGS. 4A and 4B.
Figure 5B:
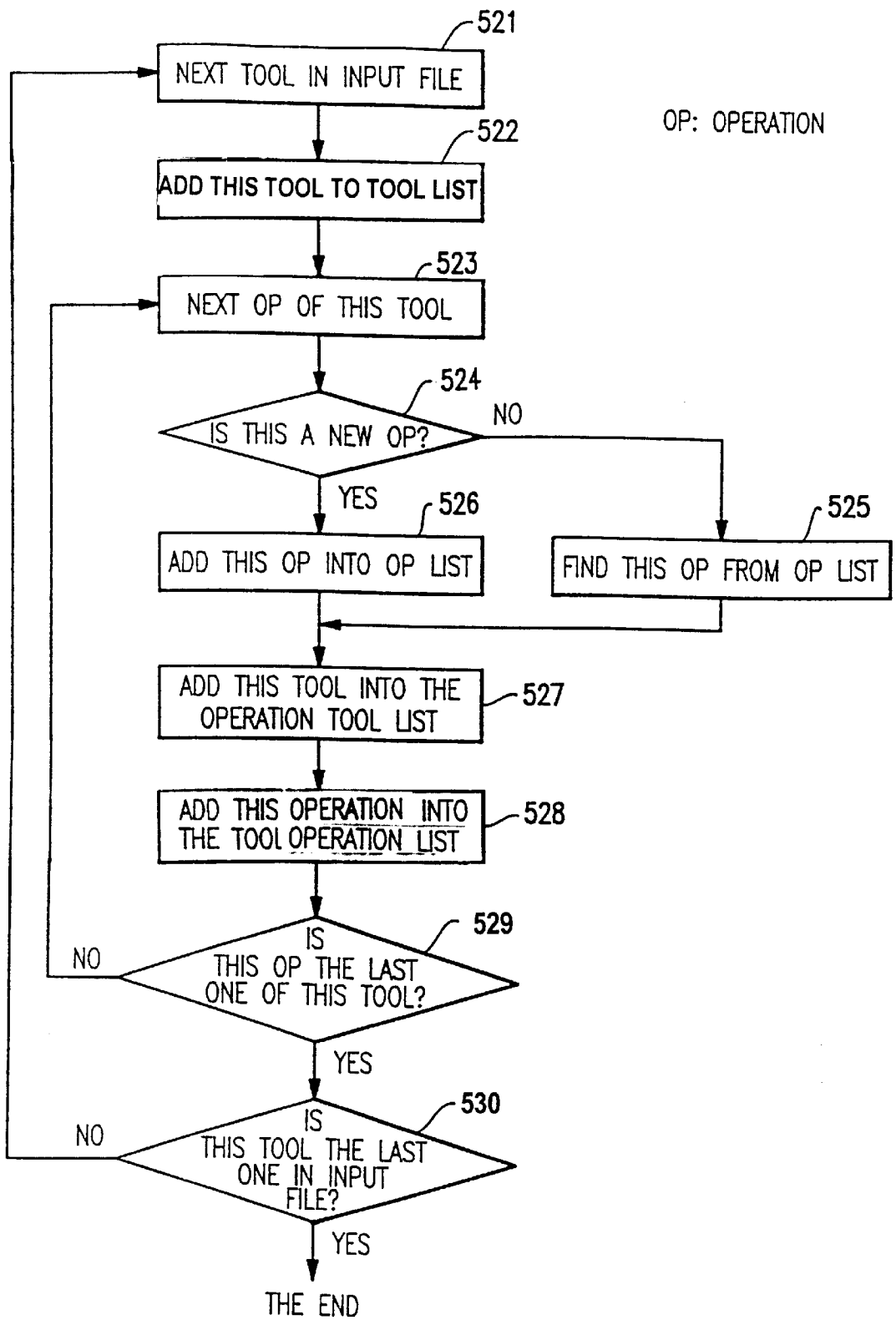
Figure 5C:
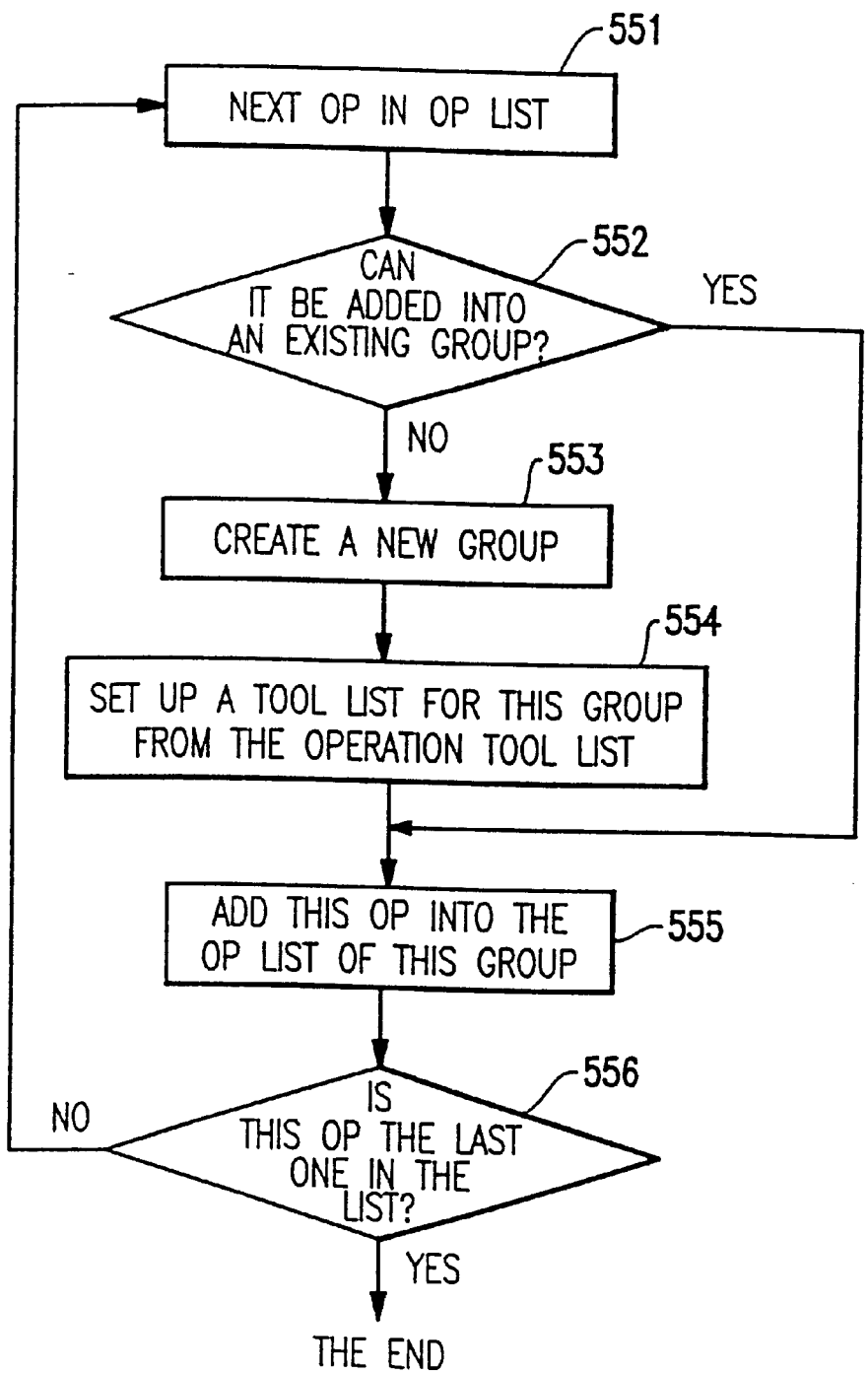

FIGS. 5A, 5B and 5C show in more detail how the computation engine 42, labeled PREPDATA, goes about organizing operations and tool groups into the aforementioned cascade groups, OperbyGrp and ToolsbyGrp. The input file 51 contains a list of all tool groups and, for each one, a list of operations that it can perform. In step 1 at operation 52, a series of software procedures, shown in more detail in FIG. 5B, reads the Input File 51 and creates both the Operations List 53 and the Tool List 54. The Operations List 53 is a list of all operations, each unique operation appearing exactly once in the list. Each operation in the Operations List 53 has a list of tools associated with it which is the list of tools that can perform this operation. This list of tools is referred to as the Operation Tool List. The Tool List 54 is a list of all the tool groups. Each tool group in the Tool List 54 has a list of operations associated with it which is the list of operations that the tool group can perform. This list of operations is referred to as the Tool Operation List.

Step 1, operation 52, is shown in more detail in FIG. 5B. Each tool in the input file is read in function block 521 and added to the Tool List in function block 522. For each tool, the next operation of the tool is determined in function block 523. A test is made in decision block 524 to determine if this is a new operation for the tool and, if not, the operation is found from the operation list in function block 525; otherwise, the operation is added to the operation list in function block 526. Then, the tool is added into the Operation Tool List in function block 527 and the operation is added to the Tool Operation List in function block 528. A test is then made in decision block 529 to determine if this operation is the last operation for this tool and, if not, the process loops back to function block 523; otherwise, a test is made in decision block 530 to determine if this tool is the last one in the input file. If the last tool in the input file, the process of step 1 ends; otherwise, the process loops back to function block 521 to read the next tool in the input file.

Step 2 at operation 55 is a series of software procedures, shown in more detail in FIG. 5C, which reads the Operations List 53 and creates the Group List 56. The Group List 56 is a list of groups, where a group is defined as a list of operations, all of which can be performed by the same set of tools, and a list of the tools which can perform these operations. In other words, a group is a list, each element of which consists of two lists; a list of operations, referred to as OperbyGrp, and a list of tools that can perform all of these operations, referred to as ToolsbyGrp. Each operation in the Operations List 53 can appear in only one group, but each tool in the Tool List 54 can appear in one or more groups.

Step 2, operation 55, is shown in more detail in FIG. 5C. Each operation in the Operations List 53 is read in function block 551, and a determination is made in decision block 552 as to whether the operation can be added into an existing group. If not, a new group is created in function block 553, and a tool list for the group is set up from the Operation Tool List in function block 554. At this point, the operation read from the Operation List is added into the operation list of the group in function block 555. A test is then made in decision block 556 to determine if this operation is the last operation in the list and, if not, the process loops back to function block 551 to read the next operation in the Operation List. When all operations in the Operation List have been processed, the process ends.

In the process implemented by the computation engine 42, C code data structures are used for the Operations List 53, including the Operation Tool List, the Tool List 54 and the Group List 56.

Referring back to FIG. 4A, the end user may also interact with the input data through a Menu Program or through a Graphical User Interface (GUI) and modify the data (for example, changing the allowed ranges for product starts 415, the profits associated with each product and/or the numbers of tools per tool group 414) for "what-if" analyses. Such trial variations are accomplished by the computational engine 44 labeled "ChgStartsTools" in FIG. 4A.

Program codes are written in C and c-shell-script languages running under the UNIX operating system environment, such as IBM's AIX operating system. Implementation is on an IBM RISC6000 workstation. Users, however, may interact with the application in client-server mode with the GUI operating on a standard IBM compatible personal computer running IBM's OS/2 operating system.

The described method for allocating work in rank order across parallel unrelated tools for capacity planning is formulated as a non-integer, linear program 45, labeled LINEAR PROGRAM in FIG. 4A, with piecewise-linear penalty terms incorporated into the objective function which serve to discourage, but not prevent, using a tool group to greater than 100% of its available time and to distribute work in the preferred sequence among such parallel, unrelated tool groups. In this way, the implementation is able to provide output data on both the number of tools needed for a particular product mix and volumes and on the optimal product mix and volumes for a fixed tool set. Output data is contained in formatted output reports 46, labeled "Output Files" in FIG. 4A, by individual time period and in multiperiod summary reports which detail required versus available numbers of tools and/or the derived optimum number of starts per day by product.

The results of the various "what-if" scenarios are organized into sets of files whose filenames end in a characteristic suffix, a trial name, initially selectable by the user and which he can use to retrieve such files by selection through the GUI or Menu. If desired, detailed output reports can be printed breaking down tool group usage by operation by operation, such information frequently being of vital interest to engineers with responsibility for particular cascade sets.

The implementation also includes a module, that using the capability described in the invention of being able to identify truly gating tool groups among parallel, unrelated tool groups, selects those tool groups for incrementing, producing a new optimal solution for product mix and volume that represents the most efficient way of increasing manufacturing line output for the least number of additional tools. Any number of automatic iterations of the tool set can be set by the user.

Alternative Embodiments

In some circumstances it may be advantageous to proceed from the constraint equations for operations to equations for the total utilization of tool groups without using the concept of cascade groups. This may be accomplished by defining two new alternate sets from Table 1A, above. Note that Table 1B is derived from Table 1A by collecting unique combinations of tool groups, assigning each unique set a cascade group set index, and associating with each group set index the operations that can be performed. We can also create from Table 1A the sets ToolsbyOper[s] showing what combinations of tool groups t can perform each operation, as shown in Table 1C, and the sets OperbyTool[t] showing what operations s can be performed on each tool group t, as shown in Table 1D:

TABLE 1C

| Oper. s | Sets ToolsbyOper[s] |
|---|---|
| 1 | 1, 2, 3 |
| 2 | 1, 2, 3 |
| 3 | 1, 2 |
| 4 | 1, 2 |
| 5 | 1, 3 |
| 6 | 1, 3 |
| 7 | 2, 3 |
| 8 | 2, 3 |
| 9 | 1 |
| 10 | 1 |
| 11 | 2 |
| 12 | 3 |

TABLE 1D

| Tool Group t | Sets OperbyTool[t] |
|---|---|
| 1 | 1, 2, 3, 4, 5, 6, 9, 10 |
| 2 | 1, 2, 3, 4, 7, 8, 11 |
| 3 | 1, 2, 5, 6, 7, 8, 12 |

Figure 4B:
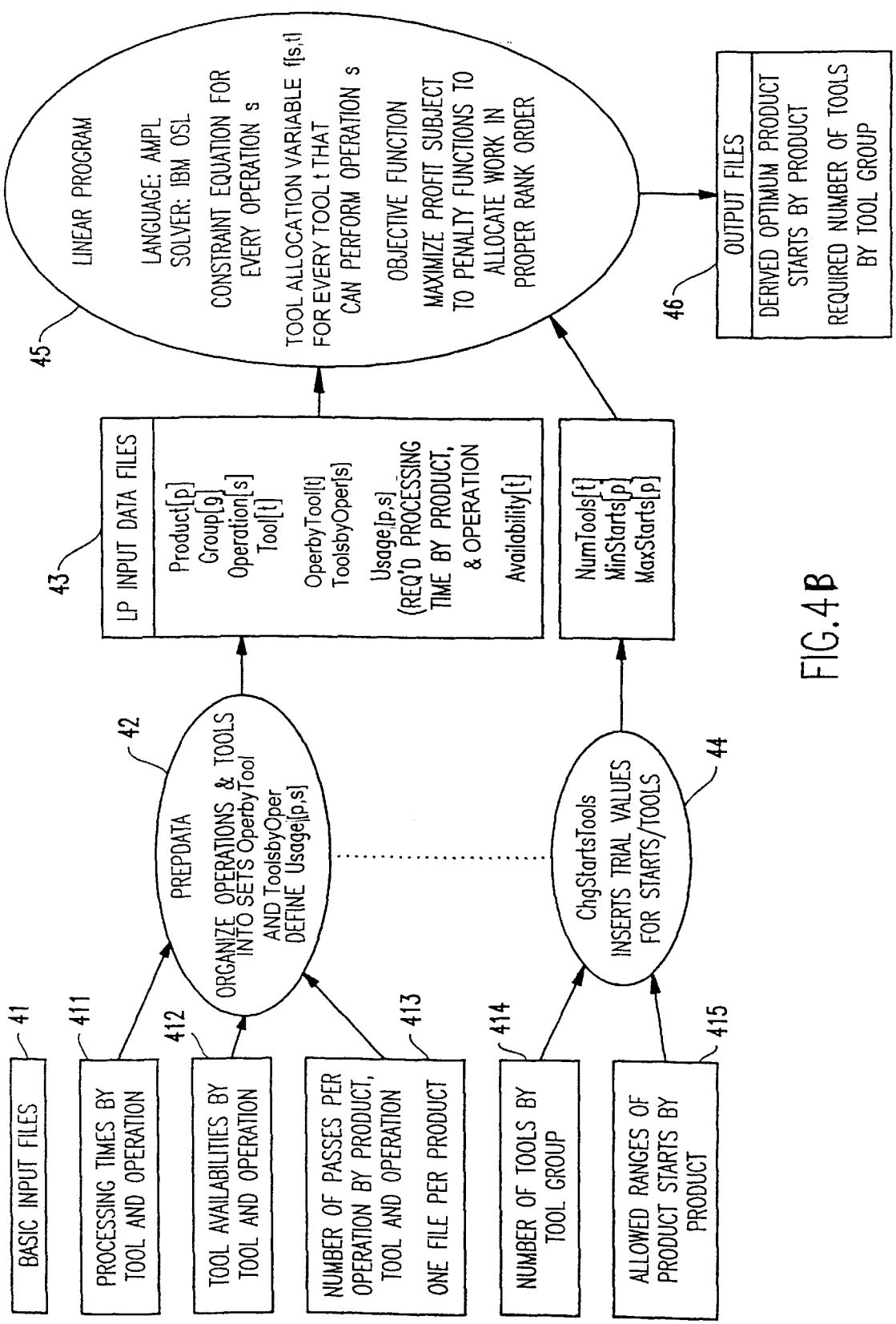

Notice that the sets ToolsbyOper[s] and OperbyTool[t] are described by only two indices, 's' and 't', with no need for a third type of index 'g' utilized for the cascade group formulation. We refer to this method as the "non-partitioning" formalism, as the set of all operations is not partitioned into the subsets 'OperbyGrp[g]'. Note that the sets ToolsbyOper[s] are the "Operation Tool List" and the sets OperbyTool[t] are the "Tool Operation List" referred to in FIGS. 5A and 5B, describing the software procedures associated with the computation engine labeled PREPDATA in FIGS. 4A and 4B.

For the non-partitioning formalism, the constraint Equation (7) becomes $$\sum_{p \in P} W_p U_{p,s} = \sum_t f_{s,t} \frac{N_t A_t}{R_{s,t}} (t \in ToolsbyOper[s]) \quad (11)$$

The equations are not grouped by subsets of the entire set of operations (OperbyGrp[g]), but run over the entire set of operations S. For each operation s, the tool groups that can perform that operation are already defined by the set ToolsbyOper[s], so that the summation is limited to these tool groups. Note that the Usage $U_{p,s}$, the tool allocation variable $f_{s,t}$ and the process time ratios $R_{s,t}$ are now solely defined by the two indices s and t, with no use of the cascade group index g. Note, however, that this formulation does not affect the existence of cascade sets and the functionality of directing work first to the primary tool group in a cascade set, and then to the secondary tool group, etc.

The summation of the fractional tool allocation variables $f_{s,t}$ to obtain the total utilization of the tool group t takes the form:

$$F_t = \sum_{s \in OperbyTool[t]} f_{s,t} \quad (12)$$

This is now a single summation over all operations s that can be performed on the tool group t, as contained in the newly defined set 'OperbyTool[t]'. Again, the two indices s and t are sufficient for this equation, with no requirement for the cascade group index g.

Thus the linear programming constraint equations have a somewhat simpler format in the non-partitioning method compared to that in the cascade group method. This is partially balanced by the larger set sizes required for ToolsbyOper[s] and OperbyTool[t] as compared to OperbyGrp[g] and ToolsbyGrp[g]. For example, for a typical case of say 2000 cascade operations, 300 cascade tool groups and 200 cascade groups, we list in Table 4 the approximate required numbers of sets and set elements within each respective set as follows:

TABLE 4

| Type of Set | Number of Sets | Number of Elements |
|---|---|---|
| OperbyGrp[g] | 200 | 2,000 |
| ToolsbyGrp[g] | 200 | 450 |
| OperbyTool[t] | 300 | 5,000 |
| ToolsbyOper[s] | 2,000 | 4,500 |

Thus some reduction in the complexity of the constraint equations is traded for an increase in the size of the sets required to organize the operations and tool groups. Although the non-partitioning method requires more memory storage, the difference is still small compared to memory requirements for the complete tool and product data. Execution times for solving the linear program are virtually the same for the cascade group and non-partitioning formalisms. The implementation for the non-partitioning method proceeds in the same way as for the cascade group method, with the exception that the description of the computational engine is given by FIG. 4B rather than FIG. 4A.

In addition to the two formulations described above, other equivalent formulations are possible that may have advantages in certain situations. For example, if the capacity planner would prefer not to work with the explicit ratios of tool processing times to those on the preferred tool group, but just with the tool processing times, an equation can be written involving such processing times. Instead of equating the required time to perform an operation across products to the quantity comprising a summation of terms which consist of the tool allocation variables multiplied by the available time per day on the respective tool groups capable of performing the operation, this equation equates the corresponding number of required parts per day being processed through the operation to the quantity comprising a summation of terms which consist of the tool allocation variables multiplied by the number of parts per day each respective tool group is capable of manufacturing.

To implement this approach, we recall the definition of the Usage from Equation (2) for a single distinct operation and generalize for multiple operations organized in cascade groups:

$$U_{p,g,s} = Y_{p,g,s} I_{p,g,s} H_{g,s,tp} \quad (13)$$

where $Y_{p,g,s}$ represents the fractional yield averaged over the integer number of passes $I_{p,g,s}$ of product p undergoing operation s contained in operation cascade group g, and $H_{g,s,tp}$ is the time required to process one part through operation s on the primary or otherwise preferred tool group, tp, of those tool groups t capable of performing operation s. Similarly generalizing Equation (3) for multiple operations organized in cascade groups, we define the quantity $$J_{p,g,s} = Y_{p,g,s} I_{p,g,s} \tag{14}$$

where $J_{p,g,s}$ is interpreted as the number of yield adjusted passes of product p undergoing operation s in cascade group g, For example, for a product undergoing an operation 6 times with a yield average over all six passes of 0.94, J=5.64. Continuing the generalization of Equation (4), the Usage can then be written as:

$$U_{p,g,s} = J_{p,g,s} H_{g,s,tp} \tag{15}$$

The tool processing-time ratios in Equation (7), $R_{g,s,t}$, can be written as $$R_{g,s,t} = H_{g,s,t}/H_{g,s,tp} \tag{16}$$

where $H_{g,s,t}$ is the time required to process one part through operation s on an arbitrary tool group t in the tool cascade group g, while $H_{g,s,tp}$ (as described above) is the processing time of the preferred tool group in the same tool cascade group g.

Substituting the above expressions for $U_{p,g,s}$ and $R_{g,s,t}$ into Equation (7) and dividing both sides of the equation by $H_{g,s,tp}$ gives the new equation $$\sum_{p \in P} W_p J_{p,g,s} = \sum_{t \in ToolsbyGrp[g]} f_{g,s,t} N_t \frac{A_t}{H_{g,s,t}} \tag{17}$$

$$\forall s \in OperbyGrp[g], \; g = 1, \ldots g_m$$

As alluded to above, the left hand side is just the required number of unit starts per day (adjusted for yield) across all products being processed through operation s, while the quantity $N_t A_t / H_{g,s,t}$ is the number of parts per day the tool group t is capable of manufacturing. The tool allocation decision variable, $f_{g,s,t}$, remains unchanged. Equation (12) for the total utilization of the tool group t also remains unchanged.

For the non-partitioning formalism, the new equation corresponding to Equation (11) is:

$$\sum_{p \in P} W_p J_{p,s} = \sum_{t \in ToolsbyOper[s]} f_{s,t} \frac{N_t A_t}{H_{s,t}} \forall s \in S \tag{18}$$

Equation (12) for the total tool group utilization in the non-partitioning formalism, is unchanged.

Use of this format does not alleviate the requirement for calculating the process time ratios, as they are still needed to determine the minimum ratios of the penalty function slopes for the non-primary tool groups used in the method to allocate the work in proper rank order to members of a cascade set.

Extension of the Penalty Function Concept to Deal with the Ranking of Tool Groups by Individual Operation In the penalty function treatment described earlier, there is an absolute rank-order of preference for tool groups in a cascade set that holds for all operations performed by that cascade set; that is, regardless of the operation, the designated primary tool group is the one to be filled first, the designated secondary tool group is the one to be filled second and so on for the tertiary and lower ranked tool groups. Sometimes it may be desirable to modify the tool group rank order depending on the particular operation being performed. Thus, for example, for operation 1 (refer to Table 1A) the rank order may be that as set out for the entire cascade set (TG1, TG2, TG3), but for operation 2, the desired rank order might be (TG2, TG1, TG3). For operation 3, the rank order might be the cascade set order (TG1, TG2), but for operation 4 it might be (TG2, TG1). To implement a scheme which takes into account rank order by individual operation, the operation/tool-group input data would need to specify the desired tool group rank order for every cascade operation. Thus the sets "ToolsbyOper[s]" now become ordered sets, with the specific order of the tool group set elements indicating the order of preference for using the tool groups for performing that operation.

In the previously described scheme, one associates a penalty function $Z_i(F_t)$ with the utilization or FracUse $F_t$ of the whole tool group, as shown in the objective function Equation (9). The quantity $F_t$ as defined in Equations (8) and (11) being the sum over all tool allocation variables associated with the tool group t, which for the cascade group method are $f_{g,s,t}$ in accordance with Equation (8), and for the non-partitioning method are $f_{s,t}$ in accordance with Equation (11). In this alternative embodiment, one creates penalty functions $Z_i$ (i=1 for primary, i=2 for secondary, i=3 for tertiary, etc.) associated with each individual tool allocation decision variable. Thus $Z_i(f_{g,s,t})$ are the penalty functions for the cascade group method and $Z_i(f_{s,t})$ are those for the non-partitioning method. Summations over all these penalty functions associated with all the individual tool allocation variables are then inserted into the LP objective function according to:

$$Maximize \sum_{p \in P} W_p P_p - \sum_{i,s,t} Z'_i(f_{s,t}) - \sum_{i,t} Z''_i(F_t) \tag{19}$$

where the expression shown in Equation (19) is that for the non-partitioning case. The aforementioned tool-allocation-variable penalty functions $Z'_i(f_{s,t})$ are contained in the second term of Equation (19). Note, however, that a third term is needed which is a modification of the previous penalty functions (the previous penalty function being $Z_i(F_t)$ where $F_t$ is the total tool-group utilization $F_t$ defined in Equation (8)), where the modified form of the function is the same as the previous penalty functions for $F_t \geq 1$ but zero for $F_t < 1$. This term is characterized by very steep slopes for $F_t > 1$, because the sum over all tool allocation variables associated with a specific tool group should not exceed the capacity of that tool group. This third term restricts the individual tool groups from being overused. It is not sufficient to restrict the tool allocation variables $f_{s,t}$ to be individually less than 1, since many such quantities may contribute to the use of a tool group.

When the order of the listing of the tool groups is the same across all operations of a cascade set as that of the general rank order preference for the set, the results obtained by the method described in the alternative embodiment should reduce to that of the original method. When a variation in rank order exists from operation to operation, this method will more accurately represent the desired distribution of work to the preferred tool groups.

While the invention has been described in terms of preferred embodiments, those skilled in the art will recognize that the invention can be practiced with modification within the spirit and scope of the appended claims.

Having thus described our invention, what we claim as new and desire to secure by letters patent is as follows:

1. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period, processing times, tool availabilities and load factors, and a number of passes per product for every operation on every tool group in a manufacturing line;

scanning a list of operations, locating identical operation names within cascade sets of tool groups and organizing the operations and tool groups into the appropriate cascade groups, OperbyGrp and ToolsbyGrp, respectively, as Linear Programming (LP) input data files, the step of organizing tool groups and the operations into the appropriate cascade groups as Linear Programming (LP) input data files including the step of combining processing times and number of times a product visits a particular operation into a derived quantity $U_{p,g,s}$, called Usage, which represents a required time to process a unit start of product p through all passes of an operation s, on a primary or otherwise preferred tool group contained in tool cascade group g;

calculating from the LP input data files an allocation of workload to parallel, unrelated tool groups in a cascade set, with a preference for an order in which the tool groups are to be used and in which ratios of process times of operations performed on different tool groups varies by operation;

generating output files which report the derived optimum product starts by product and required number of tools by tool group;

multiplying the Usage, $U_{p,g,s}$, for each operation s by a number of product starts, $W_p$, for product p;

summing over all Products, P, to obtain a total required time for that operation according to the expression $$\sum_{p \in P} W_p U_{p,g,s}$$

thus obtaining a total required time referenced to the primary or otherwise preferred tool group in tool cascade group t for all products being processed through operation s;

then allocating the total required time over the tool groups contained in tool cascade group g capable of performing that operation, according to the expression $$\sum f_{g,s,t} \frac{N_t A_t}{R_{g,s,t}},$$

each tool group having its own fractional allocation decision variable, $f_{g,s,t}$;

taking into account variable process time ratios, $R_{g,s,t}$, on such tool groups to a process time of the primary tool group by introducing an effective available time per day $$\frac{A_t}{R_{g,s,t}},$$

obtained by dividing actual available time per day, $A_t$, by a respective variable process time ratio, $R_{g,s,t}$, and further multiplying by a number of tools in the tool group, $N_t$, to obtain an effective available time per day for an entire tool group;

summing the fractional allocation decision variable $f_{g,s,t}$ for each tool group over all operations contained within the set OperbyGrp[g], that contains all operations associated with the cascade group g, and then summing over all those tool cascade groups, ToolsbyGrp[g], to which that tool group belongs according to the expression $$F_t = \sum_{g: t \in ToolsbyGrp[g]} \sum_{s \in OperbyGrp[g]} f_{g,s,t}$$

in order to obtain a total fractional use decision variable, $F_t$, for that tool group for use in a linear program (LP) objective function that constrains utilization of that tool group; and employing penalty functions having very steep slopes above a fractional use (FracUse) of one, said penalty functions being so employed in order to achieve a feasible solution to the Linear Programming (LP) equations when tool groups are forced to be used beyond their capacity for product starts at the minimum of their ranges, said feasible solution providing information on the amount by which tool group capacity is exceeded.

2. The computer implemented method of claim 1, wherein tool groups and operations are organized into sets ToolsbyOper[s], and wherein said inputting step includes desired tool group rank order for every operation, said sets ToolsbyOper[s] thereby becoming ordered sets, further comprising the step of employing penalty functions associated with each tool allocation decision variable to track operations and tool groups in each cascade set in order to allocate work in a proper rank order of tool groups by operation, said penalty functions being adjusted to maximize use of the primary tool group while minimizing use of the non-primary tool groups, said adjustment placing the primary tool group penalty function above a horizontal axis with negative slope and placing the non-primary tool group penalty functions below said horizontal axis with positive slope, said adjustment further providing for the ratio of the penalty slopes of any two non-primary tool groups to exceed the ratio of the respective processing rates of said any two non-primary tool groups, wherein work is directed to a slower higher ranked tool group in preference to a faster lower ranked tool group.

3. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period, processing times, tool availabilities and load factors, and a number of passes per product for every operation on every tool group in a manufacturing line;

scanning a list of operations, locating identical operation names within cascade sets of tool groups and organizing the operations and tool groups into the appropriate cascade groups, OperbyGrp and ToolsbyGrp, respectively, as Linear Programming (LP) input data files, the step of organizing tool groups and the operations into the appropriate cascade groups as Linear Programming (LP) input data files including the step of combining processing times and number of times a product visits a particular operation into a derived quantity $U_{p,g,s}$, called Usage, which represents a required time to process a unit start of product p through all passes of an operation s, on a primary or otherwise preferred tool group contained in tool cascade group g;

calculating from the LP input data files an allocation of workload to parallel, unrelated tool groups in a cascade set, with a preference for an order in which the tool groups are to be used and in which ratios of process times of operations performed on different tool groups varies by operation;

generating output files which report the derived optimum product starts by product and required number of tools by tool group;

multiplying the Usage, $U_{p,g,s}$, for each operation s by a number of product starts, $W_p$, for product p;

summing over all products, P, to obtain a total required time for that operation according to the expression $$\sum_{p \in P} W_p U_{p,g,s}$$

thus obtaining a total required time referenced to the primary or otherwise preferred tool group in tool cascade group t for all products being processed through operation s;

then allocating the total required time over the tool groups contained in tool cascade group g capable of performing that operation, according to the expression $$\sum f_{g,s,t} \frac{N_t A_t}{R_{g,s,t}},$$

each tool group having its own fractional allocation decision variable, $f_{g,s,t}$;

taking into account variable process time ratios, $R_{g,s,t}$, on such tool groups to a process time of the primary tool group by introducing an effective available time per day $$\frac{A_t}{R_{g,s,t}},$$

obtained by dividing actual available time per day, $A_t$, by a respective variable process time ratio, $R_{g,s,t}$, and further multiplying by a number of tools in the tool group, $N_t$, to obtain an effective available time per day for an entire tool group;

summing the fractional allocation decision variable $f_{g,s,t}$, for each tool group over all operations contained within the set OperbyGrp[g], that contains all operations associated with the cascade group g, and then summing over all those tool cascade groups, ToolsbyGrp[g], to which that tool group belongs according to the expression $$F_t = \sum_{g:t \in ToolsbyGrp[g]} \sum_{s \in OperbyGrp[g]} f_{g,s,t}$$

in order to obtain a total fractional use decision variable, $F_t$, for that tool group for use in a linear program (LP) objective function that constrains utilization of that tool group; and employing penalty functions to track tool groups in each cascade set in order to allocate work in a proper rank order of tool groups, said penalty functions being adjusted to maximize use of the primary tool group while minimizing use of the non-primary tool groups, said adjustment placing the primary tool group penalty function above a horizontal axis with negative slope and placing the non-primary tool group penalty functions below said horizontal axis with positive slope, said adjustment further providing for the ratio of the penalty slopes of any two non-primary tool groups to exceed the ratio of the respective processing rates of said any two non-primary tool groups, wherein work is directed to a slower higher ranked tool group in preference to a faster lower ranked tool group.

4. The computer implemented method of claim 3 further comprising the step of employing penalty functions to identify gating tool groups among those tool groups in a cascade set operating at full capacity, said penalty functions being applied in a narrow intermediate region beginning at a tool group fractional use (FracUse) of one (1.0), said region having an upper limit in a small interval above one (1.0), said small interval being arbitrarily small, wherein within said small interval said penalty functions have slopes which are adjusted, relative to the slopes of the same penalty functions for a fractional use (FracUse) of less than one, in such a way as to drive the operating point for said gating tool groups to said upper limit of said narrow intermediate region.

5. The computer implemented method of claim 4 further comprising receiving inputs from a user changing a number of tools by tool group and allowed ranges of product starts by product in order to generate trial outputs to "what-if" scenarios.

6. A computer implemented method of allocating work in capacity planning for manufacturing environments comprising parallel, unrelated tools that can process the same operations at different rates and with preferences for the sequence in which those tools are selected to accommodate a workload, said method comprising the steps of:

aggregating data of all the sequential operations of the parallel, unrelated tools and the processes needed to produce a product by time period into a set of distinct operations by identifying sequential operations that are actually the same operation performed on different products and also identifying the same sequential operations performed multiple times on a single product, sequential operations being all the separate operations performed in sequence on each separate product processed on a manufacturing line and the number of multiple times the same sequential operations are performed on a single product being referred to as the number of passes for that distinct operation on that product;

scanning the aggregated data for the distinct operations, locating identical distinct operations within individual cascade sets of tool groups, and organizing operations and tool groups into related sets; and formulating a non-integer, linear program having said related sets as input with piecewise-linear penalty terms incorporated into an objective function which distributes work in a preferred sequence among such parallel, unrelated tool groups and which linear program, by the use of a summation in the objective function of product starts multiplied by profit or revenue per product start, also can optimize product mix for a fixed tool set when product starts are allowed to vary by product type over finite ranges, wherein said related sets are the sets OperbyGrp and ToolsbyGrp determined, respectively, by the collection into disjoint sets of all those operations that can be performed on specific sets of tool groups, and by the specific sets of tool groups that can perform the operations in each of the sets OperbyGrp.

7. A computer implemented method of allocating work in capacity planning for manufacturing environments comprising parallel, unrelated tools that can process the same operations at different rates and with preferences for the sequence in which those tools are selected to accommodate a workload, said method comprising the steps of:

aggregating data of all the sequential operations of the parallel, unrelated tools and the processes needed to produce a product by time period into a set of distinct operations by identifying sequential operations that are actually the same operation performed on different products and also identifying the same sequential operations performed multiple times on a single product, sequential operations being all the separate operations performed in sequence on each separate product processed on a manufacturing line and the number of multiple times the same sequential operations are performed on a single product being referred to as the number of passes for that distinct operation on that product;

scanning the aggregated data for the distinct operations, locating identical distinct operations within individual cascade sets of tool groups, and organizing operations and tool groups into related sets; and formulating a non-integer, linear program having said related sets as input with piecewise-linear penalty terms incorporated into an objective function which distributes work in a preferred sequence among such parallel, unrelated tool groups and which linear program, by the use of a summation in the objective function of product starts multiplied by profit or revenue per product start, also can optimize product mix for a fixed tool set when product starts are allowed to vary by product type over finite ranges, wherein said related sets are the sets ToolsbyOper and OperbyTool determined, respectively, by what are the specific combinations of tool groups that can perform each operation and the specific sets of operations that can be performed on each tool group.

8. A computer implemented method of allocating work in capacity planning for manufacturing environments comprising parallel, unrelated tools that can process the same operations at different rates and with preferences for the sequence in which those tools are selected to accommodate a workload, said method comprising the steps of:

aggregating data of all the sequential operations of the parallel, unrelated tools and the processes needed to produce a product by time period into a set of distinct operations by identifying sequential operations that are actually the same operation performed on different products and also identifying the same sequential operations performed multiple times on a single product, sequential operations being all the separate operations performed in sequence on each separate product processed on a manufacturing line and the number of multiple times the same sequential operations are performed on a single product being referred to as the number of passes for that distinct operation on that product;

scanning the aggregated data for the distinct operations, locating identical distinct operations within individual cascade sets of tool groups, and organizing operations and tool groups into related sets; and formulating a non-integer, linear program having said related sets as input with piecewise-linear penalty terms incorporated into an objective function which distributes work in a preferred sequence among such parallel, unrelated tool groups and which linear program, by the use of a summation in the objective function of product starts multiplied by profit or revenue per product start, also can optimize product mix for a fixed tool set when product starts are allowed to vary by product type over finite ranges, wherein each said distinct operation is a sequential operation.

9. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period processing times, tool availabilities and load factors, and a number of passes per product for every operation on every tool group in a manufacturing line;

scanning a list of operations, locating identical operation names within cascade sets of tool groups and organizing the operations and tool groups as Linear Programming (LP) input data files;

calculating from the LP input data files an allocation of workload to parallel, unrelated tool groups in a cascade set, with a preference for an order in which the tool groups are to be used and in which ratios of process times of operations performed on different tool groups varies by operation; and generating output files which report the derived optimum product starts by product and required number of tools by tool group, wherein the step of calculating an allocation of workload to parallel, unrelated tool groups in a cascade set further comprises the step of employing penalty functions having very steep slopes above a fractional use (FracUse) of one, said penalty functions being so employed in order to achieve a feasible solution to the Linear Programming (LP) equations when tool groups are forced to be used beyond their capacity for product starts at the minimum of their ranges, said feasible solution providing information on the amount by which tool group capacity is exceeded.

10. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period processing times, tool availabilities and load factors, and a number of passes per product for every operation on every tool group in a manufacturing line;

scanning a list of operations, locating identical operation names within cascade sets of tool groups and organizing the operations and tool groups as Linear Programming (LP) input data files;

calculating from the LP input data files an allocation of workload to parallel, unrelated tool groups in a cascade set, with a preference for an order in which the tool groups are to be used and in which ratios of process times of operations performed on different tool groups varies by operation; and generating output files which report the derived optimum product starts by product and required number of tools by tool group, wherein the step of calculating an allocation of workload to parallel, unrelated tool groups in a cascade set further comprises the step of employing penalty functions to track tool groups in each cascade set in order to allocate work in a proper rank order of tool groups, said penalty functions being adjusted to maximize use of the primary tool group while minimizing use of the non-primary tool groups, said adjustment placing the primary tool group penalty function above a horizontal axis with negative slope and placing the non-primary tool group penalty functions below said horizontal axis with positive slope, said adjustment further providing for the ratio of the penalty slopes of any two non-primary tool groups to exceed the ratio of the respective processing rates of said any two non-primary tool groups, wherein work is directed to a slower higher ranked tool group in preference to a faster lower ranked tool group.

11. The computer implemented method of claim 10 further comprising the step of employing penalty functions to identify gating tool groups among those tool groups in a cascade set operating at full capacity, said penalty functions being applied in a narrow intermediate region beginning at a tool group fractional use (FracUse) of one (1.0), said region having an upper limit in a small interval above one (1.0), said small interval being arbitrarily small, wherein within said small interval said penalty functions have slopes which are adjusted, relative to the slopes of the same penalty functions for a fractional use (FracUse) of less than one, in such a way as to drive the operating point for said gating tool groups to said upper limit of said narrow intermediate region.

12. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period processing times, tool availabilities and load factors, and a number of passes per product for every operation on every tool group in a manufacturing line;

scanning a list of operations, locating identical operation names within cascade sets of tool groups and organizing the operations and tool groups as Linear Programming (LP) input data files;

calculating from the LP input data files an allocation of workload to parallel, unrelated tool groups in a cascade set, with a preference for an order in which the tool groups are to be used and in which ratios of process times of operations performed on different tool groups varies by operation; and generating output files which report the derived optimum product starts by product and required number of tools by tool group, further comprising as part of the step of organizing tool groups and the operations as Linear Programming (LP) input data files the steps of organizing tool groups and the operations into the sets ToolsbyOper and OperbyTool, respectively, and combining processing times and number of times a product visits a particular operation into a derived quantity $U_{p,s}$, called Usage, which represents a required time to process a unit start of product p through all passes of an operation s, on a primary or otherwise preferred tool capable of processing operation s.

13. The computer implemented method of claim 12 further comprising the steps of:

multiplying the Usage, $U_{p,s}$, for each operation s by a number of product starts, $W_p$, for product p;

summing over all products, P, to obtain a total required time for that operation according to the expression $$\sum_{p \in P} W_p U_{p,s}$$

thus obtaining a total required time referenced to the primary or otherwise preferred tool group of those tool groups capable of performing operation s;

then allocating the total required time over the tool groups contained in tool groups capable of performing operation s, according to the expression $$\sum_{t \in ToolsbyOper[s]} f_{s,t} \frac{N_t A_t}{R_{s,t}},$$

each tool group having its own fractional allocation variable, $f_{s,t}$, that represents the fraction of the total capacity of the tool group t that is devoted to performing operation s; and taking into account variable process time ratios, $R_{s,t}$, on such tool groups to a process time of the preferred tool group by introducing an effective available time per day, $$\frac{A_t}{R_{s,t}},$$

obtained by dividing actual available time per day, $A_t$, by a respective variable process time ratio, $R_{s,t}$, and further multiplying by a number of tools in the tool group, $N_t$, to obtain an effective available time per day for an entire tool group.

14. The computer implemented method of claim 13 further comprising the step of summing the fractional allocations $f_{s,t}$ for each tool group over all operations capable of being performed on that tool group, OperbyTool[t], according to the expression $$F_t = \sum_{s \in OperbyTool[t]} f_{s,t}$$

in order to obtain a total fractional use $F_t$ of that tool group that is a decision variable used in a linear program (LP) objective function that constrains utilization of that tool group.

15. The computer implemented method of claim 14 further comprising the step of employing penalty functions to track tool groups in each cascade set in order to allocate work in a proper rank order of tool groups, said penalty functions being adjusted to maximize use of the primary tool group while minimizing use of the non-primary tool groups, said adjustment placing the primary tool group penalty function above a horizontal axis with negative slope and placing the non-primary tool group penalty functions below said horizontal axis with positive slope, said adjustment further providing for the ratio of the penalty slopes of any two non-primary tool groups to exceed the ratio of the respective processing rates of said any two non-primary tool groups, wherein work is directed to a slower higher ranked tool group in preference to a faster lower ranked tool group.

16. The computer implemented method of claim 15 further comprising the step of employing penalty functions to identify gating tool groups among those tool groups in a cascade set operating at full capacity, said penalty functions being applied in a narrow intermediate region beginning at a tool group fractional use (FracUse) of one (1.0), said region having an upper limit in a small interval above one (1.0), said small interval being arbitrarily small, wherein said penalty functions have slopes which are adjusted, relative to slopes of penalty functions having a fractional use (FracUse) of less than one, in such a way as to drive the operating point for said gating tool groups to said upper limit of said narrow intermediate region.

17. The computer implemented method of claim 16 further comprising the step of receiving inputs from a user changing a number of tools by tool group and allowed ranges of product starts by product in order to generate trial outputs to "what-if" scenarios.

18. The computer implemented method of claim 14 further comprising the step of employing penalty functions having very steep slopes above a fractional use (FracUse) of one, said penalty functions being so employed in order to achieve a feasible solution to the Linear Programming (LP) equations when tool groups are forced to be used beyond their capacity for product starts at the minimum of their ranges, said feasible solution providing information on the amount by which tool group capacity is exceeded.

19. The computer implemented method of claim 18, wherein said inputting step includes desired tool group rank order for every operation, and wherein said sets ToolsbyOper[s] thereby become ordered sets, further comprising the step of employing penalty functions associated with each tool allocation decision variable to track operations and tool groups in each cascade set in order to allocate work in a proper rank order of tool groups by operation, said penalty functions being adjusted to maximize use of the primary tool group while minimizing use of the non-primary tool groups, said adjustment placing the primary tool group penalty function above a horizontal axis with negative slope and placing the non-primary tool group penalty functions below said horizontal axis with positive slope, said adjustment further providing for the ratio of the penalty slopes of any two non-primary tool groups to exceed the ratio of the respective processing rates of said any two non-primary tool groups, wherein work is directed to a slower higher ranked tool group in preference to a faster lower ranked tool group.

20. The computer implemented method of claim 12 further comprising the steps of:

dividing the Usage, $U_{p,s}$, for each operation s by the time required to process one part through operation s on the preferred tool group tp of cascade group g, $H_{s,tp}$, to obtain the number of yield adjusted passes of product p undergoing operation s in cascade group g, $J_{p,s}$;

multiplying the number of yield adjusted passes, $J_{p,s}$, for each operation s by a number of product starts, $W_p$, for product p;

summing over all products, P, to obtain a total number of unit starts per day adjusted for yield across all products being processed through operation s according to the expression $$\sum_{p \in P} W_p J_{p,s};$$

and then allocating the total number of parts per day over the tool groups contained in tool groups capable of performing that operation s, according to the expression $$\sum f_{s,t} \frac{N_t A_t}{H_{s,t}},$$

each tool group having its own fractional allocation decision variable, $f_{s,t}$, that represents the fraction of the total capacity of the tool group t that is devoted to performing operation s, and the quantity $$\frac{N_t A_t}{H_{s,t}}$$

representing the number of parts per day tool group t is capable of manufacturing.

21. The computer implemented method of claim 20, wherein the step of calculating an allocation of workload to parallel, unrelated tool groups in a cascade set further comprises the step of employing penalty functions having very steep slopes above a fractional use (FracUse) of one, said penalty functions being so employed in order to achieve a feasible solution to the Linear Programming (LP) equations when tool groups are forced to be used beyond their capacity for product starts at the minimum of their ranges, said feasible solution providing information on the amount by which tool group capacity is exceeded.

22. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period processing times, tool availabilities and load factors, and a number of passes per product for every operation on every tool group in a manufacturing line;

scanning a list of operations, locating identical operation names within cascade sets of tool groups and organizing the operations and tool groups into the appropriate cascade groups, OperbyGrp and ToolsbyGrp, respectively, as Linear Programming (LP) input data files, and combining processing times and number of times a product visits a particular operation into a derived quantity $U_{p,g,s}$, called Usage, which represents a required time to process a unit start of product p through all passes of an operation s, on a primary or otherwise preferred tool group contained in tool cascade group g;

calculating from the LP input data files an allocation of workload to parallel, unrelated tool groups in a cascade set, with a preference for an order in which the tool groups are to be used and in which ratios of process times of operations performed on different tool groups varies by operation;

generating output files which report the derived optimum product starts by product and required number of tools by tool group;

dividing the Usage, $U_{p,g,s}$, for each operation s by the time required to process one part through operation s on the preferred tool group tp of cascade group g, $H_{g,s,tp}$, to obtain the number of yield adjusted passes of product p undergoing operation s in cascade group g, $J_{p,g,s}$;

multiplying the number of yield adjusted passes, $J_{p,g,s}$, for each operation s by a number of product starts, $W_p$, for product p;

summing over all products, P, to obtain a total number of unit starts per day adjusted for yield across all products being processed through operation s according to the expression $$\sum_{p \in P} W_p J_{p,g,s};$$

and then allocating the total number of parts per day over the tool groups contained in tool cascade group g capable of performing that operation, according to the expression $$\sum f_{g,s,t} \frac{N_t A_t}{H_{g,s,t}},$$

each tool group having its own fractional allocation decision variable, $f_{g,s,t}$, and the quantity $$\frac{N_t A_t}{H_{g,s,t}}$$

representing the number of parts per day tool group t is capable of manufacturing.

23. The computer implemented method of claim 22, wherein the step of calculating an allocation of workload to parallel, unrelated tool groups in a cascade set further comprises the step of employing penalty functions having very steep slopes above a fractional use (FracUse) of one, said penalty functions being so employed in order to achieve a feasible solution to the Linear Programming (LP) equations when tool groups are forced to be used beyond their capacity for product starts at the minimum of their ranges, said feasible solution providing information on the amount by which tool group capacity is exceeded.

* * * * *